(12) United States Patent
Ben Ezer

(10) Patent No.: US 11,055,836 B2
(45) Date of Patent: Jul. 6, 2021

(54) OPTICAL CONTRAST ENHANCEMENT FOR DEFECT INSPECTION

(71) Applicant: CAMTEK LTD.

(72) Inventor: Zehava Ben Ezer, Balfuria (IL)

(73) Assignee: CAMTEK LTD., Migdal Haemek (IL)

( * ) Notice: Subject to any disclaimer, the term of this patent is extended or adjusted under 35 U.S.C. 154(b) by 0 days.

(21) Appl. No.: 16/273,162

(22) Filed: Feb. 12, 2019

(65) Prior Publication Data

US 2019/0251686 A1 Aug. 15, 2019

Related U.S. Application Data

(60) Provisional application No. 62/629,761, filed on Feb. 13, 2018.

(51) Int. Cl.
*G06T 7/00* (2017.01)
*G01N 21/88* (2006.01)
*G02B 27/30* (2006.01)
*H04N 5/232* (2006.01)

(52) U.S. Cl.
CPC ....... *G06T 7/0002* (2013.01); *G01N 21/8806* (2013.01); *G02B 27/30* (2013.01); *H04N 5/23212* (2013.01)

(58) Field of Classification Search
CPC .......................... G06T 7/0002; G01N 21/8806
USPC .......................................................... 348/135
See application file for complete search history.

(56) References Cited

U.S. PATENT DOCUMENTS

| | | | | |
|---|---|---|---|---|
| 6,362,923 B1* | 3/2002 | Lange | ................ | G02B 17/0808 359/354 |
| 2002/0186879 A1* | 12/2002 | Hemar | ............ | G01N 21/95607 382/149 |
| 2003/0038931 A1* | 2/2003 | Toyoda | ................ | G03F 7/70058 355/67 |
| 2011/0075151 A1* | 3/2011 | Jeong | ................... | G01N 21/956 356/453 |
| 2015/0226539 A1* | 8/2015 | Roeth | ................ | G01N 21/8806 356/614 |

* cited by examiner

*Primary Examiner* — Jeffery A Williams
(74) *Attorney, Agent, or Firm* — Reches Patent

(57) ABSTRACT

An inspection system and a method for inspection an object. The method may include acquiring a defocused image of an area of an object, and processing the defocused image of the area to find a phase shift between optical paths associated with certain proximate points of the area. The phase shift may be indicative of a defect. The acquiring of the defocused image may include illuminating the area with a radiation beam that may be spatially coherent and collimated when impinging on the area. The illuminating may include passing the radiation beam through an aperture that may be defined by an aperture stop that may be positioned within an aperture stop plane. The size of the aperture may be a fraction of a size of the aperture stop.

22 Claims, 6 Drawing Sheets

OPTICAL CONTRAST ENHANCEMENT FOR DEFECT INSPECTION

CROSS REFERENCE

This application claims priority from U.S. provisional patent 62/629,761 filing date Feb. 13, 2018.

BACKGROUND OF THE INVENTION

Defect inspection of semiconductor by two dimensional (2D) optical imaging with enhanced contrast of defect.

Some defects are not characterized by reflectance or transmission difference in contrast to the surrounding, thus are hard to be detected using standard bright-field or dark-field imaging.

Such defects may have properties of small topography variation or local stress affecting the local refraction index.

Methods using phase contrast imaging usually enhance contrast of defects in the 2D image.

Such methods, such as DIC (differential interference contrast), require special optical elements to be inserted in the optical illumination and imaging path.

BRIEF DESCRIPTION OF THE INVENTION

Figure 1:
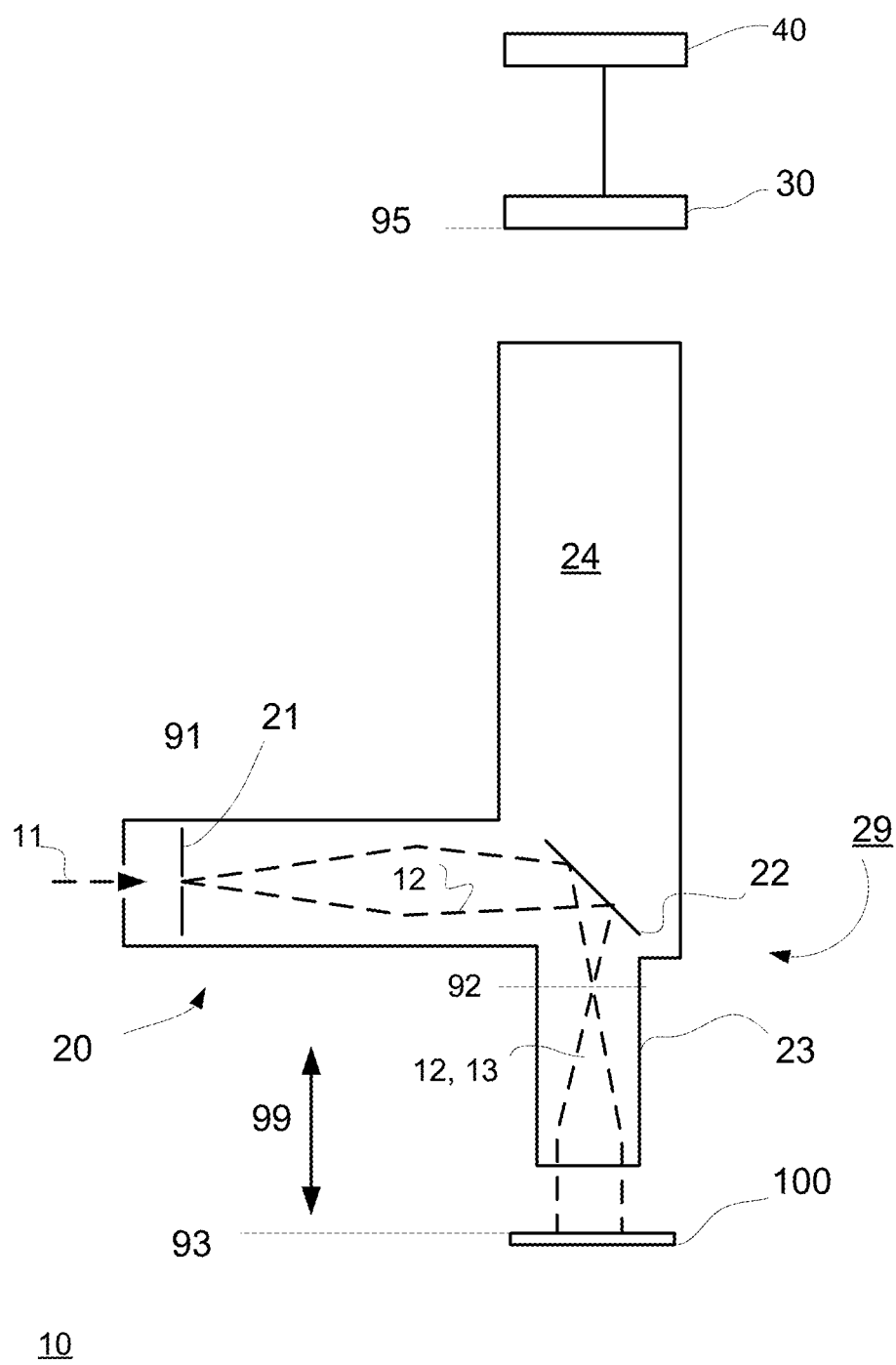
Figure 2:
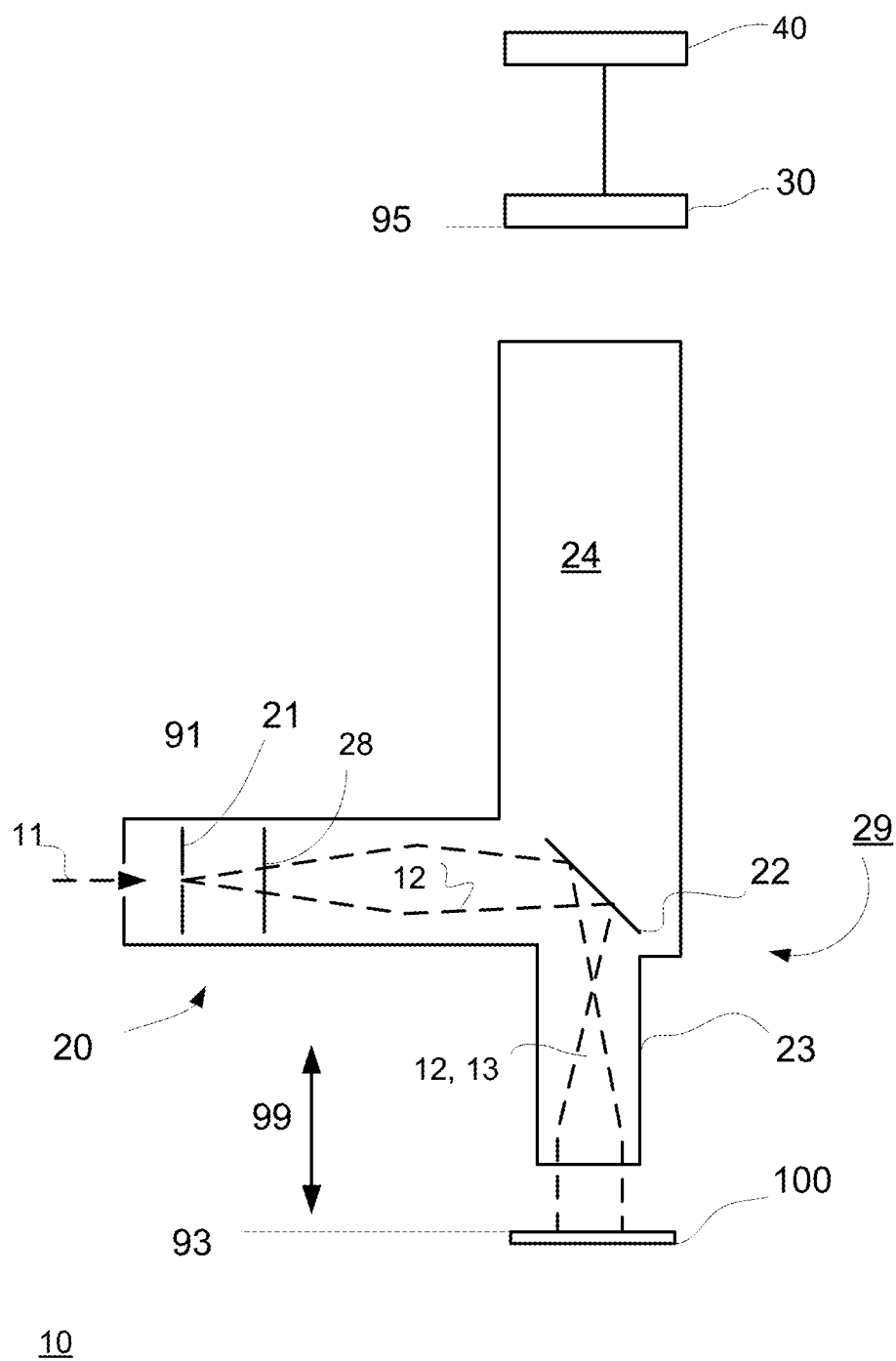
Figure 3:
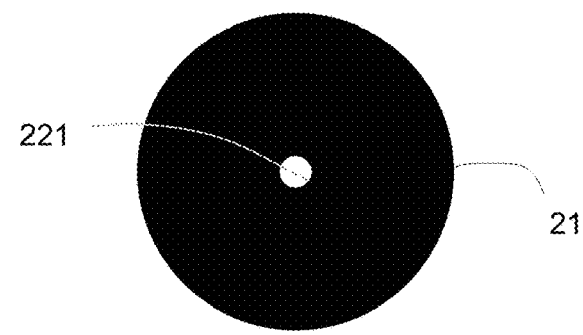
Figure 3:
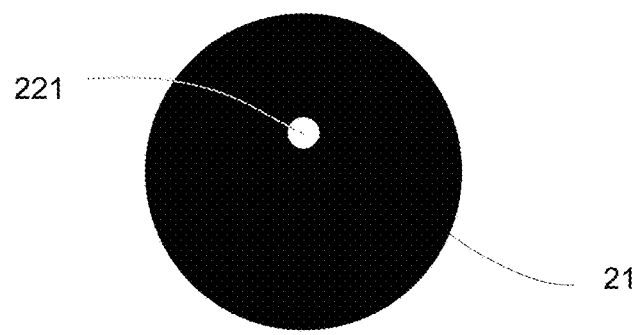
Figure 3:
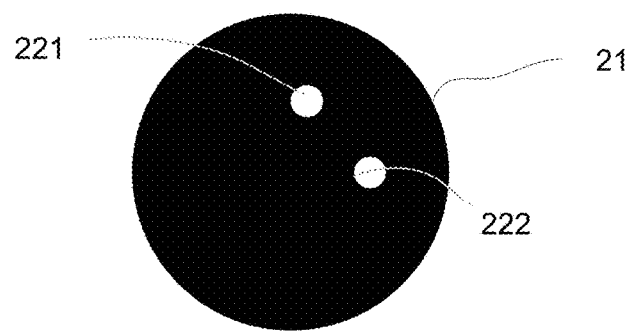
Figure 4:
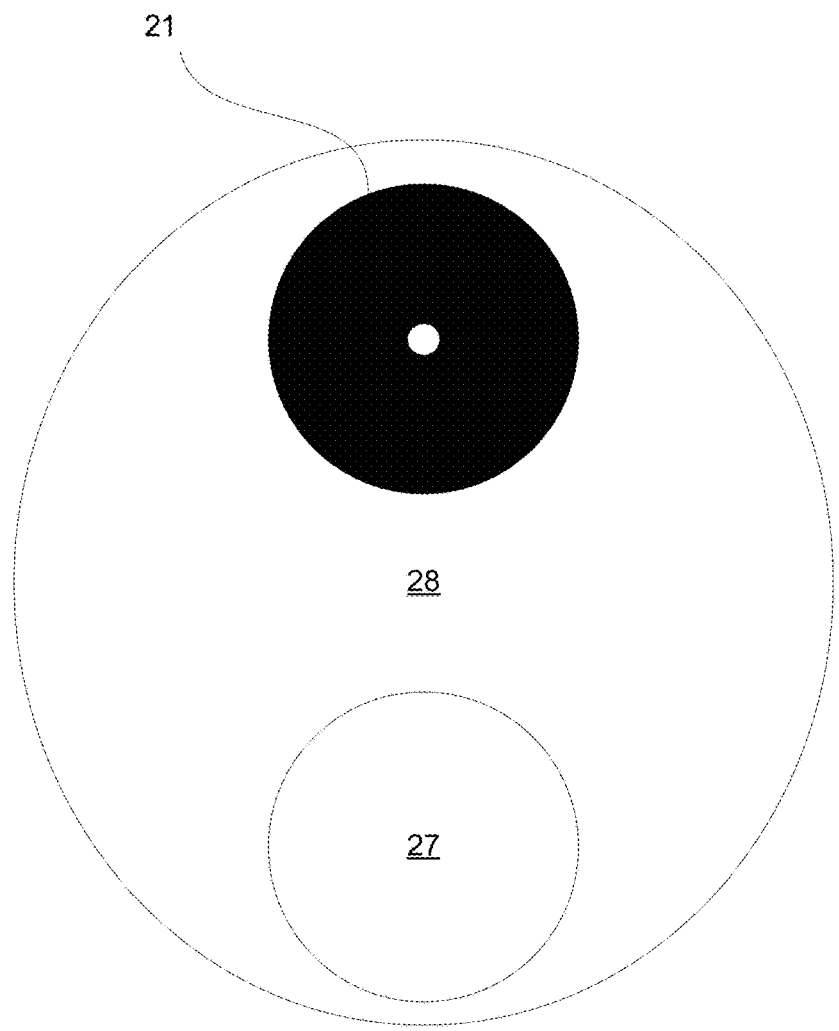
Figure 5:
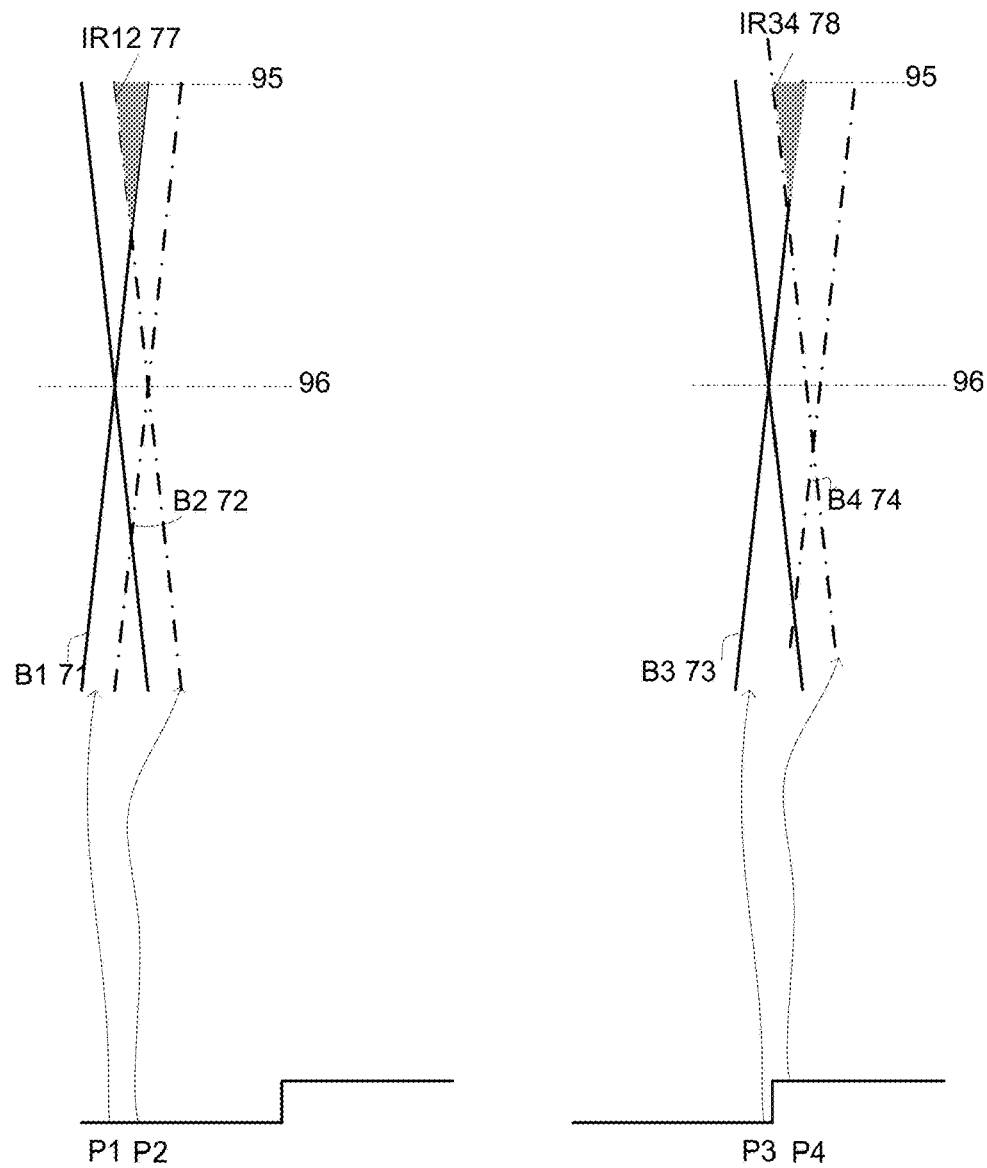
Figure 6:
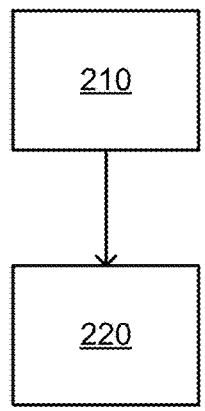

The present invention will be understood and appreciated more fully from the following detailed description taken in conjunction with the drawings; wherein FIG. 1 is an example of a system;
FIG. 2 is an example of a system;
FIG. 3 includes examples of aperture stops;
FIG. 4 illustrates an example of a part of the system;
FIG. 5 illustrates examples of differences between interference patterns; and
FIG. 6 illustrates an example of a method.

SUMMARY

There may be provided a method for inspection an object, the method may include acquiring a defocused image of an area of an object; and processing the defocused image of the area to find a phase shift between optical paths associated with certain proximate points of the area; wherein the phase shift may be indicative of a defect. The acquiring of the defocused image may include illuminating the area with a radiation beam that may be spatially coherent and collimated when impinging on the area. The illuminating may include passing the radiation beam through an aperture that may be defined by an aperture stop that may be positioned within an aperture stop plane. The size of the aperture may be a fraction of a size of the aperture stop.

The aperture may be circular or may have any other shape—elliptical, polygon, and the like.

The area (inspected area) may be of any shape and size. The area may be located within a field of view of the inspection system.

The acquiring of the defocused image of the area may include sensing, by a sensor, sensed radiation that was reflected by the area; wherein the sensed radiation may include interference patterns formed between radiation reflected from different points of the area; wherein the different points of the area may include the certain proximate points and additional points.

The method may include sensing a difference between interference patterns associated with the certain proximate points and interference patterns associated with the additional points.

The fraction may not exceed one till about two and a half percent.

The aperture may be located at a center of the aperture stop.

The aperture may be located outside a center of the aperture stop. This may assist in removing reflection of the light source from the defocused image.

The acquiring of the defocused image may be preceded by entering the aperture stop within an illumination path and may be followed by removing the aperture stop from the illumination path.

The method may include acquiring multiple defocused images of the area, at different defocus conditions.

The method may include selecting a selected defocus condition of the different defocus conditions and acquiring defocused images of areas of other objects using the selected defocus condition.

The selecting may be based on contrast associated with the phase shift.

There may be provided an inspection system that may include an imager that may be constructed and arranged to acquire a defocused image of an area of an object; and a processor that may be constructed and arranged to process the defocused image of the area to find a phase shift between optical paths associated with certain proximate points of the area. The phase shift may be indicative of a defect. The imager may include illumination optics that may be constructed and arranged to illuminate the area with a radiation beam that may be spatially coherent and collimated when impinging on the area. The illumination optics may include an aperture stop that may include an aperture. The illumination optics may be constructed and arranged to pass the radiation beam through the aperture before reaching the area. The size of the aperture may be a fraction of a size of the aperture stop.

The imager may include a sensor that may be constructed and arranged to sense sensed radiation that was reflected by the area; wherein the sensed radiation may include interference patterns formed between radiation reflected from different points of the area; wherein the different points of the area may include the certain proximate points and additional points.

The sensor may be constructed and arranged to sense a difference between interference patterns associated with the certain proximate points and interference patterns associated with the additional points.

The fraction may not exceed ten percent.

The aperture may be located at a center of the aperture stop.

The aperture may be located outside a center of the aperture stop.

The inspection system wherein aperture stop may be a removable part of the illumination optics.

The imager may be constructed and arranged to acquire multiple defocused images of the area, at different defocus conditions.

The processor may be constructed and arranged to select a selected defocus condition of the different defocus conditions and acquire defocused images of areas of other objects using the selected defocus condition.

The processor may be constructed and arranged to select based on contrast associated with the phase shift.

DETAILED DESCRIPTION OF THE INVENTION

Because the apparatus implementing the present invention is, for the most part, composed of optical components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

The terms light and radiation are used in an interchangeable manner.

The terms having, including, comprising, consisting, and consisting essentially of are used in an interchangeable manner. Thus, a method that include steps may include only these steps, more than these steps, and the like.

There is provided a method and a system for achieving optical contrast enhancement of such defects by introducing modification in the optical path.

The method and the system may use minimal changes to normal bright field systems—thus is very cost effective.

It should also be noted that the inspection system may be a bright field or a dark field. Any reference to a bright field system may be applied mutatis mutandis to a dart field system.

The method and system achieve defect inspection of semiconductor by 2D optical imaging with enhanced contrast of defect.

There may be provided a system that may be a microscope with bright field imaging option for semiconductor defect inspection is introduced with special means and methods to enable visualization of "transparent defects".

Such defects cannot be detected by standard bright field or dark-field imaging techniques. However, they do introduce a small phase shift of the light relative to the background.

Defects of this type include bubbles, fine scratches, slip lines in epi layers, stress defects, etc.

The method and/or system may implement at least one of the following:

a. Creating collimated light with high spatial coherence impinging on the object plane. The light is collimated when impinging on the object.
b. Finding the optimal defocus for creation of constructive or destructive interference of a defect and background in semiconductors, achieved by special optical setting of a standard bright field microscope
c. Controlling defocus level to get optimized contrast of interference
d. Determining defocus level with a positive or negative offset to control a destructive or constructive interference
e. Achieving collimated light introducing an aperture stop with small diameter at the Kohler illumination input.

Different aperture stops of different shapes can be selected, such as the opening is decentered at various distances to enable changing the angles of incidence The microscope modes can be easily interchanged between standard bright field imaging and the contrast enhancement mode.

The method can be used to differentiate flat smooth surface of semiconductor wafer from rough surface of the same wafer, thus surface haze can be analyzed.

In order to cope low contrast features in an image by improving contrast of the feature, which otherwise is not visible by standard bright field or dark filed imaging. The method creates collimated light with high spatial coherence impinging on the object plane. And finds the optimal defocus for creation of constructive or destructive interference of the defect and background.

In order to cope with introducing phase contrast enhancement components in the optical path is complicated and expensive by allowing introducing modifications in the standard optical path are simpler. The method may create collimated illumination can be done by introduction of a special aperture stop in the Kohler illumination to create the collimated light.

One such scheme is using a small circular stop.

FIG. 1 illustrates a system 10 that includes an illumination path 20 that provides light 11 that passes through an aperture of a beam stop 21 (also referred to as shape controlled aperture stop—located at aperture stop plane 91) to form beam 12, progress towards a beam splitter 22, is directed (by beam splitter 22) towards an objective lens 23 (the objective lens has an exit pupil plane 92) and through an objective lens 23 and a wafer (100) that is located in an object plane 93.

The de-focusing changes the focus point of the light from the object plane.

Light from the wafer (reflected light) passes through 23 objective lens (and through the objective lens exit pupil plane), through the beam splitter 22, towards a tube lens 24 and onto a camera 30 located within an image plane 95. The camera 30 is coupled to processor 40.

The illumination path 20 includes beam stop 21, beam splitter 22, and objective lens 23.

The collection path 29 includes beam splitter 22, objective lens 23, and tube lens 24.

It should be noted that while FIG. 1 illustrates an inspection system with a beam splitter—than bright field may be achieved without the beam splitter—for example by illuminating the object from one side and collecting light from another side.

It should be noted that the inspection system may also change the polarization of the impinging beam and/or of the reflected beam and by introducing polarizing elements such as a polarizer in the illumination path, before the illumination path or after the illumination path. See, for example, polarizer 28 that follows the beam stop in FIG. 2.

FIG. 3 illustrates various examples of aperture stop 21.

The aperture stop 21 illustrated at the top of the figure includes an aperture 221 located at the center of the aperture stop 21.

The aperture stop 21 illustrated at the center of the figure includes an aperture 221 located at outside the center of the aperture stop 21.

The aperture stop 21 illustrated at the bottom of the figure includes aperture 221 and an additional aperture 222.

The location of the aperture stop may determine the angle of illumination of the area of the object. Apertures of different locations may emphasize defects that are oriented at different orientations—usually at an orientation that is normal to the angle of illumination.

Illuminating the same area using apertures of different locations within the aperture stop may provide information about phase shifts resulting from defects oriented at different angles.

The collimated light can be obtained by using in the aperture stop an aperture stop that has one or more openings—the area of each opening is much smaller (for example—the radius of the opening is about ten to fifteen percent of the radius of the opening of the objective lens exit pupil plane) than the opening of the objective lens exit pupil plane.

When there are multiple apertures than the radius of each aperture may be a fraction of the radius of the aperture stop. Optionally—the aggregate radius of all apertures may be a fraction of the radius of the aperture stop.

The apertures may not be circular—and in this case their size (area) is a fraction of the size (area) of the aperture stop.

The aperture stop 21 may be selectively inserted into the illumination path. The insertion may be done manually or automatically. The aperture stop 21 may be replaced by a non-blocking aperture that maintains the aperture plane clear of any interference (and thus enable the inspection system to operate in another mode—such as a bright field mode. It is noted that aperture stops of different configurations (different location of an aperture, different size of an aperture, different number of aperture) may be replaced automatically or manually. The replacement may involve applying any movement—linear, non-linear, circular (see turret 28 that rotates thereby selectively inserting aperture stop 21 or full aperture 27) that will selectively insert or remove the aperture stop 21 into the illumination path.

FIG. 5 illustrates that there is a difference between (a) the first interference pattern IR12 77 generated by points (P1 and P2) that are proximate to each other—but exhibit a same optical path, and (b) the second interference pattern IR34 78 generated by points (P3 and P4) that are proximate to each other—but exhibit another optical path.

In the focal plane the radiation from proximate points do not overlap.

Because of the defocusing—the first beam B1 71 from first point P1 overlaps with the second beam B2 72 from second point P2—thereby generating a first interference pattern IR12 77.

Because of the defocusing—the third beam B3 73 from third point P3 overlaps with the fourth beam B4 74 from fourth point P4—thereby generating a second interference pattern IR34 78.

The first interference pattern IR12 77 differs from the second interference pattern IR34 78. Especially—the integrated intensity of the first interference pattern IR12 77 sensed by the camera (especially by a pixel of the camera) differs from the integrated intensity of the second interference pattern IR34 78 sensed by the camera (especially by a pixel of the camera). Thus—it expected that the gray level of background pixels differ from the gray levels of pixels at the border of a defect.

FIG. 6 illustrates method 200 for inspection an object.

Method 200 may start by step 210 of acquiring a defocused image of an area of an object.

Step 220 may be followed by step 220 of processing the defocused image of the area to find a phase shift between optical paths associated with certain proximate points of the area; wherein the phase shift is indicative of a defect.

The phase shift results in interference patterns that differs from the interference patterns caused without the phase difference. Phase difference may be introduced due to height or other topographic differences and/or by differences in refraction indexes of points that are close to each other.

Step 210 may include illuminating the area with a radiation beam that is spatially coherent and collimated when impinging on the area. The illuminating may include passing the radiation beam through an aperture that is defined by an aperture stop that is positioned within an aperture stop plane. The size of the aperture is a fraction of the size of the aperture stop.

The fraction may not exceed one to two and two and a half percent. This may be achieved, for example, when the aperture radius is between about ten to fifteen percent of the radius of the aperture stop.

The aperture may be located at or outside a center of the aperture stop.

Step 210 may include sensing, by a sensor, sensed radiation that was reflected by the area; wherein the sensed radiation comprises interference patterns formed between radiation reflected from different points of the area. The different points of the area may include the certain proximate points and additional points.

Step 220 may include sensing a difference between interference patterns associated with the certain proximate points and interference patterns associated with the additional points.

The aperture stop may be selectively inserted and removed from the illumination path. The acquiring of the defocused image may be preceded by entering the aperture stop within an illumination path and may be followed by removing the aperture stop from the illumination path.

Steps 210 and 220 may be executed multiple times—while changing at least one configuration (change a defocus condition such as a distance between a part of the inspection system and the object, change the aperture of the aperture stop, change the aperture stop, and the like).

The multiple iterations of steps 210 and 220 may be executed till any stop condition is fulfilled—for example till checking a predefined number of different configurations, till reaching a good enough contract, till finding a certain defect, and the like.

The multiple iterations may exhibit different defocusing parameters—and they may be followed by selecting the selecting a selected defocus condition. The selected defocus condition may be used to evaluate other areas of the object, areas of other objects—especially other object of the same type.

The selecting may be based on contrast associated with the phase shift. For example—the contrast may be between gray level of pixels between which these is the phase shift. The selection may include selecting the defocus condition that provides the highest gray level difference or a high enough gray level difference.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

I claim:

1. A method for inspection an object, the method comprises:
    acquiring a defocused image of an area of an object; and
    processing the defocused image of the area to find a phase shift between optical paths associated with proximate points of the area; wherein the phase shift is indicative of a defect;
    wherein the acquiring of the defocused image comprises illuminating the area with a radiation beam that is spatially coherent and collimated when impinging on the area;
    wherein the illuminating comprises passing the radiation beam through an aperture that is defined by an aperture stop that is positioned within an aperture stop plane; and
    wherein a size of the aperture is a fraction of a size of the aperture stop; wherein the acquiring of the defocused image is preceded by entering the aperture stop within an illumination path and is followed by removing the aperture stop from the illumination path.

2. The method according to claim 1 wherein the acquiring of the defocused image of the area comprises sensing, by a sensor, sensed radiation that was reflected by the area; wherein the sensed radiation comprises interference patterns formed between radiation reflected from different points of the area; wherein the different points of the area comprise the proximate points and additional points.

3. The method according to claim 2 comprising sensing a difference between interference patterns associated with the proximate points and interference patterns associated with the additional points.

4. A method for inspection an object, the method comprises: acquiring a defocused image of an area of an object and processing the defocused image of the area to find a phase shift between optical paths associated with proximate points of the area; wherein the phase shift is indicative of a defect wherein the acquiring of the defocused image comprises illuminating the area with a radiation beam that is spatially coherent and collimated when impinging on the area; wherein the illuminating comprises passing the radiation beam through an aperture that is defined by an aperture stop that is positioned within an aperture stop plane; and wherein a size of the aperture is a fraction of a size of the aperture stop; wherein the fraction does not exceed one to two and a half percent.

5. The method according to claim 1 wherein the aperture is located at a center of the aperture stop.

6. The method according to claim 1 wherein the aperture is located outside a center of the aperture stop.

7. The method according to claim 4 wherein the acquiring of the defocused image is preceded by entering the aperture stop within an illumination path and is followed by removing the aperture stop from the illumination path.

8. The method according to claim 4 comprising acquiring multiple defocused images of the area, at different defocus conditions.

9. A method for inspection an object, the method comprises: acquiring a defocused image of an area of an object; and processing the defocused image of the area to find a phase shift between optical paths associated with proximate points of the area; wherein the phase shift is indicative of a defect wherein the acquiring of the defocused image comprises illuminating the area with a radiation beam that is spatially coherent and collimated when impinging on the area; wherein the illuminating comprises passing the radiation beam through an aperture that is defined by an aperture stop that is positioned within an aperture stop plane; and wherein a size of the aperture is a fraction of a size of the aperture stop; wherein the method comprises:
    acquiring multiple defocused images of the area, at different defocus conditions;
    selecting a selected defocus condition of the different defocus conditions; and
    acquiring defocused images of areas of other objects using the selected defocus condition.

10. The method according to claim 9 wherein the selecting of the selected defocus condition is based on contrast associated with the phase shift.

11. The method according to claim 1 wherein the illuminating further comprises passing the radiation beam through an additional aperture that is defined by the aperture stop.

12. An inspection system that comprises:
    an imager that is constructed and arranged to acquire a defocused image of an area of an object; and
    a processor that is constructed and arranged to process the defocused image of the area to find a phase shift between optical paths associated with proximate points of the area;
    wherein the phase shift is indicative of a defect;
        wherein the imager comprises illumination optics that are constructed and arranged to illuminate the area with a radiation beam that is spatially coherent and collimated when impinging on the area;
        wherein the illumination optics comprise an aperture stop that comprises an aperture;
        wherein the illumination optics is constructed and arranged to pass the radiation beam through the aperture before reaching the area;
        wherein a size of the aperture is a fraction of a size of the aperture stop;
        wherein the imager is constructed and arranged to acquire multiple defocused images of the area, at different defocus conditions; and wherein the processor is constructed and arranged to select a selected defocus condition of the different defocus conditions and acquire defocused images of areas of other objects using the selected defocus condition.

13. The inspection system according to claim 12 wherein the imager comprises a sensor that is constructed and arranged to sense sensed radiation that was reflected by the area; wherein the sensed radiation comprises interference patterns formed between radiation reflected from different points of the area; wherein the different points of the area comprise the proximate points and additional points.

14. The inspection system according to claim 13 wherein the sensor is constructed and arranged to sense a difference between interference patterns associated with the proximate points and interference patterns associated with the additional points.

15. An inspection system that comprises:
an imager that is constructed and arranged to acquire a defocused image of an area of an object; and
a processor that is constructed and arranged to process the defocused image of the area to find a phase shift between optical paths associated with proximate points of the area;
wherein the phase shift is indicative of a defect;
wherein the imager comprises illumination optics that are constructed and arranged to illuminate the area with a radiation beam that is spatially coherent and collimated when impinging on the area;
wherein the illumination optics comprise an aperture stop that comprises an aperture;
wherein the illumination optics is constructed and arranged to pass the radiation beam through the aperture before reaching the area; and
wherein the fraction does not exceed one to two and a half percent.

16. The inspection system according to claim 12 wherein the aperture is located at a center of the aperture stop.

17. The inspection system according to claim 12 wherein the aperture is located outside a center of the aperture stop.

18. The inspection system according to claim 12 wherein aperture stop is a removable part of the illumination optics.

19. The inspection system according to claim 15 wherein the imager is constructed and arranged to acquire multiple defocused images of the area, at different defocus conditions.

20. The inspection system according to claim 19 wherein the processor is constructed and arranged to select a selected defocus condition of the different defocus conditions and acquire defocused images of areas of other objects using the selected defocus condition.

21. The inspection system according to claim 19 wherein the processor is constructed and arranged to select the selected defocus condition based on contrast associated with the phase shift.

22. The inspection system according to claim 12 wherein the aperture stop comprises an additional aperture.

* * * * *